United States Patent [19]
Saito et al.

[11] 4,066,378
[45] Jan. 3, 1978

[54] MULTI-SPINDLE DRILLING MACHINE

[75] Inventors: Toshio Saito, Shizuoka; Tadahiko Kobayashi, Gotenba, both of Japan

[73] Assignee: Fuji Seiki Machine Works, Ltd., Japan

[21] Appl. No.: 737,419

[22] Filed: Nov. 1, 1976

[51] Int. Cl.² .................................. B23B 39/18
[52] U.S. Cl. ............................................ 408/46
[58] Field of Search ............................ 408/42, 46

[56] References Cited
U.S. PATENT DOCUMENTS

| | | | |
|---|---|---|---|
| 3,203,282 | 8/1965 | Wilson | 408/46 |
| 3,529,496 | 9/1970 | Halex | 408/46 |
| 3,652,175 | 3/1972 | Walters et al. | 408/46 |
| 3,765,786 | 10/1973 | Oecki | 408/46 |
| 3,822,958 | 7/1974 | Lewis | 408/46 |

Primary Examiner—Harrison L. Hinson
Attorney, Agent, or Firm—Blanchard, Flynn, Thiel, Boutell & Tanis

[57] ABSTRACT

A multi-spindle drilling machine which can perform drilling and tapping using a number of spindles in such a way that by dividing the pitch circle of the holes to be worked into several divisions, all holes are machined by a number of strokes of the spindle head. The setting of the tool spindles is done within a short time by a simple arrangement with the aid of a conventional electronic calculator.

9 Claims, 13 Drawing Figures $\triangle CSO = \triangle BSO$
$\triangle DTO = \triangle DAO$

MULTI-SPINDLE DRILLING MACHINE

BACKGROUND OF THE INVENTION

This invention relates to a multi-spindle drilling and tapping machine which effectively drills or taps numerous holes located on the periphery of the circle in a definite pitch.

Hitherto, such holes in same size located on the periphery of the certain circle diameter in a definite pitch on the disc-shaped work, are drilled or tapped by mounting said disc on a dividing index table. Each hole is drilled and, after that, the index table rotates and locates a position in a certain division corresponding to the pitch of the holes. The cycle of drilling and indexing is repeated until whole holes are worked out. Another method is the use of the multi-spindle drilling machine by setting the tool spindles on the periphery of the circle with a determined pitch distance therebetween. The former method is not efficient. The latter method is intricate and time-consuming in setting the numerous spindles in a definite pitch on the certain circle. Also, the pitch circle of the holes to be drilled can not exceed the effective drilling area of the spindle head.

This invention relates to an efficient and time-saving multi-spindle drilling machine which can perform drilling and tapping using a number of spindles in such a way that by dividing the pitch circle of the holes to be worked into several divisions, all holes are machined by the number of strokes of the spindle head which is the same as the number of divisions of the pitch circle. The setting of the tool spindles is done within a short time by a simple arrangement with the aid of a conventional electronic computer.

DETAILED DESCRIPTION

Figure 1B:
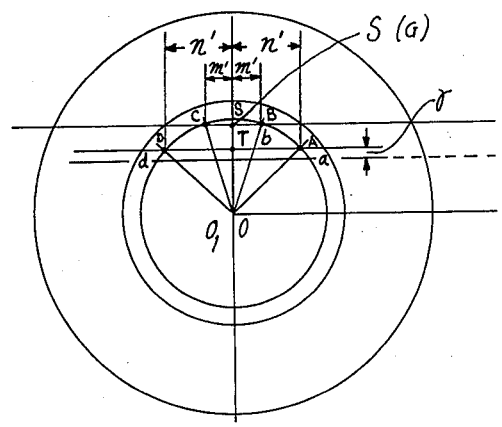
FIGS. 1A–1C: Illustrations of the principle embodied in the multi-spindle drilling machine of this invention.
Figure 1A:
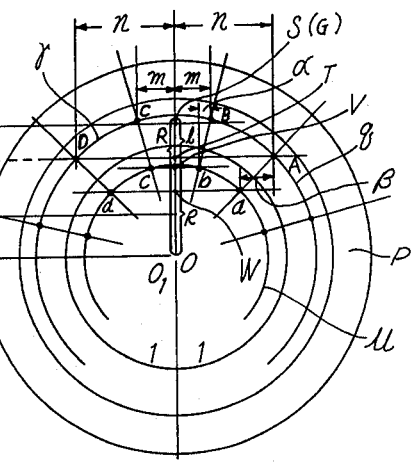

Proceeding to describe an example of an embodiment of the invention, the principle which constitutes this invention shall first be explained by reference to FIGS. 1A and 1B. In FIG. 1A, a number of uniformly spaced holes denoted as A, B, C and D, are drilled on the disc P and are located on the circle $q$ of which the center is denoted as O and radius as R. Connect A and D, and also B and C, by chord lines. Connect center S of the line BC and center O of the circle $q$. The crossing of the line OS and line AD is denoted as T. Line BC and line AD are in parallel. Accordingly, $$SB = SC = m, AT = DT = n.$$

It is obvious that the pair of holes A and D, also the pair of holes B and C, are symmetrical to the line OS.

On the same disc P, assume the same number of holes with equal pitch distance on the circle $u$ with its radius $k$ with common center O, are to be drilled. The drilled holes are denoted as $a, b, c, d$. Connect center of the holes $b$ and $c$, and also holes $a$ and $d$, by chord lines. The center of the line $bc$ is denoted as V. Lay V on the radius OS, and the crossing of the line ad and radius OS is noted as W. Then, line $bc$ ∥ line ad
$Vc = Vb$
$Wa = Wd$ It is obvious that the pair of holes $a$ and $d$, also the pair of holes $b$ and $c$, are symmetrical to the line OS.

Assume the location of the line BC is fixed. The location of the line $bc$ on the circle $u$ is moved to join the line BC on the circle $q$. Center V is to be united with center S. This pattern is the same as if the center of the circle $u$ is moved on the radius line OS with through a distance U (refer to the FIG. 1B). In this state, make holes B and C on the pitch circle $q$ approach symmetrically toward the radius OS through distance $\delta = BS - bV$, then holes B and C overlie the location of holes $b$ and $c$; make holes A and D approach symmetrically toward the radius OS through distance $\beta = AT - aW$, and line AD to move radially on the line OS through distance $r$ away from center O so that holes A and D overlie the location of holes $a$ and $d$ as shown in FIG. 1B.

In the above description, holes A, B, C and D are in the same location with the drills, so the drills can be denoted with the same symbols as the corresponding holes. Accordingly, drills (B) and (C) are installed to facilitate moving symmetrically to the line OS nearer or further on the line BC, and drills (A) and (D) are installed to facilitate moving symmetrically to the radius OS nearer or further on the line AD, and line AD can move relative to the line BC nearer or further in parallel thereto and disc P can be turned in a few divisions of the circle. By the above mentioned device of arranging the drill spindles and the indexing device of the disc, the holes on a certain pitch diameter in definite pitch can be drilled or tapped. This is the principle of this invention.

Figure 2B:
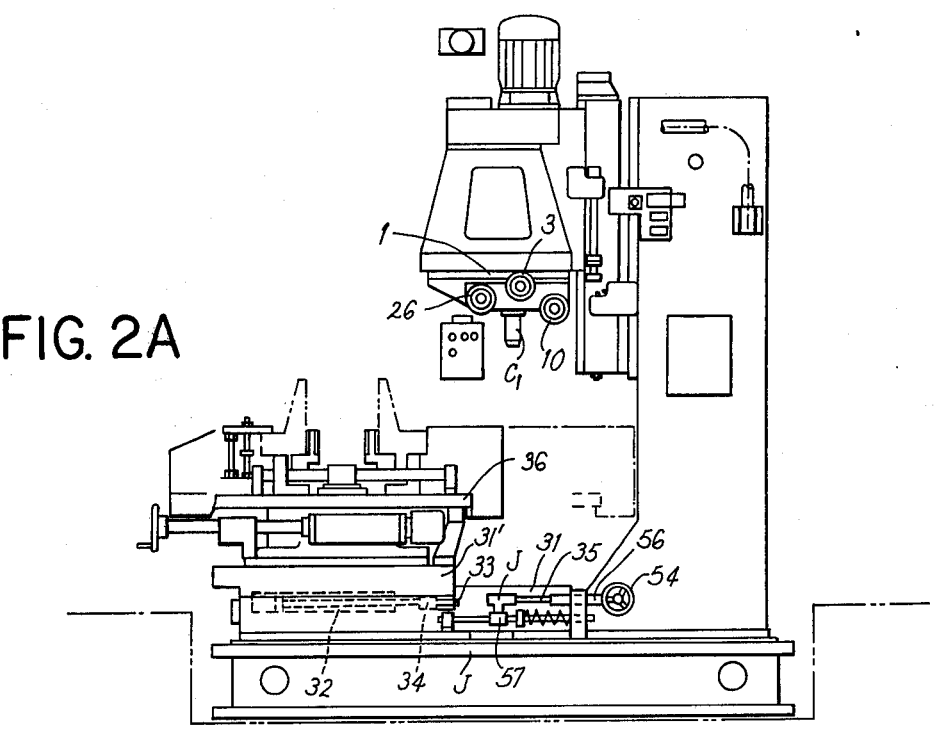
FIG. 2B: A plan view of the machine.
Figure 2A:
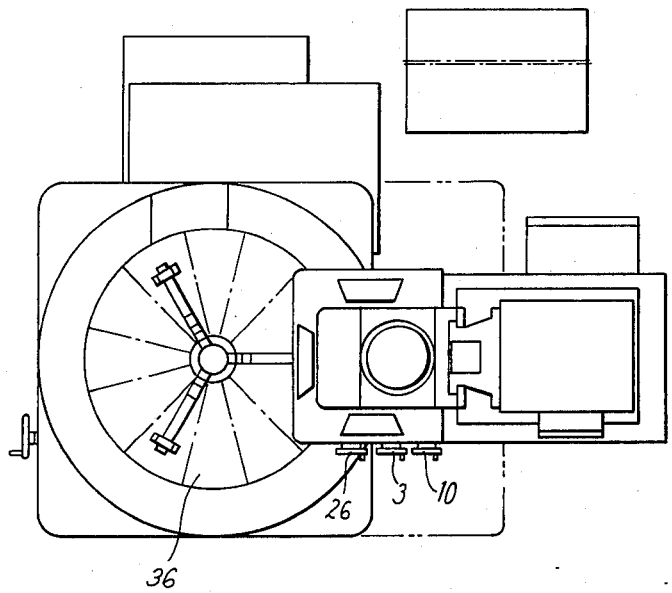
FIG. 2A: Front view of the multi-spindle drilling machine.
Figure 2C:
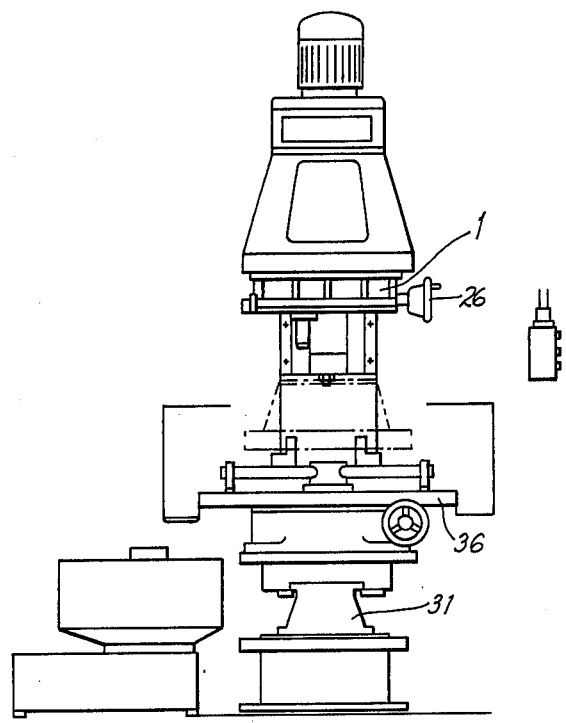
FIG. 2C: A side view of the machine.

Now, one example of the machine embodying this invention shall be described. FIGS. 2A, 2B, 2C show this multi-spindle drilling machine.

Figure 3:
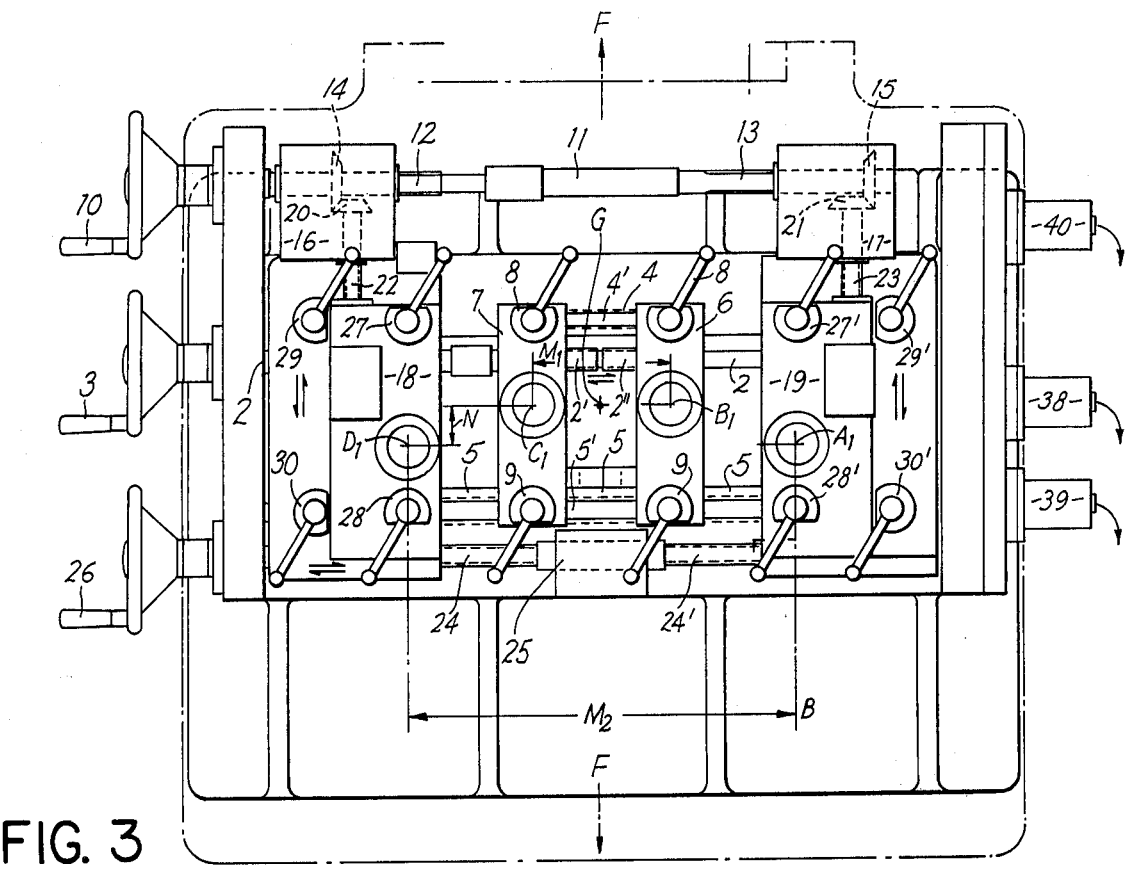
FIG. 3: A bottom view of the cluster plate.
Figure 4:
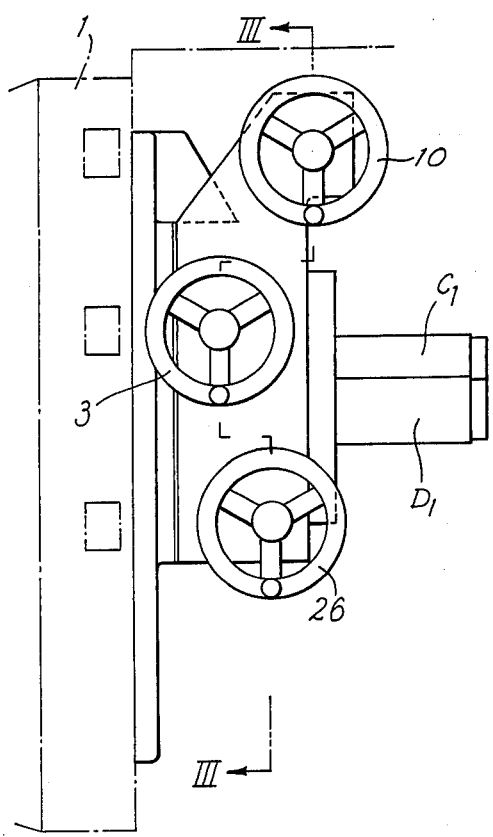
FIG. 4: A left-hand view of the cluster plate.

Refer first to FIG. 3. The first threaded spindle (or threaded rod) 2 is supported on the cluster plate 1 by the bearings so as to be perpendicular to the center line F — F. This threaded spindle has opposite hand threads 2' and 2" on its opposite ends. This spindle can be rotatably turned by the handle 3. There are parallel guide ways 4 and 5 having T-shaped slots 4' and 5'. The spindle supports 6 and 7 of drill spindles $B_1$ and $C_1$, which can slide on the guide ways, can be fixed by the clamps 8 and 9 on the guide ways 4 and 5. The spindle supports 6 and 7 are united by threads to the first threaded spindle 2. By turning handle 3, spindle supports 6 and 7 slide on the guide ways 4 and 5, thus moving equal distances towards or from the center line F — F symmetrically. Next, the guide spindle 11 is supported on the cluster plate 1 perpendicular to the center line F — F. The guide spindle 11 is rotatably turned by the handle 10. The both ends of the guide spindle form axially extending spline shafts 12 and 13. Bevel gears 14 and 15 mate with these spline shaft parts and can axially slide on them respectively. Large sliding blocks 16 and 17 which contain and support the bevel gears 14 and 15 in their inside respectively, are slidably supported on the guide spindle 11 and guide way 5. Large sliding blocks 16 and 17 have the cross slides 18 and 19 mounted thereon, and these cross slides can move in parallel to the center line F — F by the threaded spindles 22 and 23. These two spindles are turned by the pairs of bevel gears 14–20 and 15–21 respectively. The large sliding blocks 16 and 17 are united with second threaded spindles 25 by threads and can be moved by turning handle 26 positively or negatively so that the sliding blocks move symmetrically to the line F — F nearer or further. The drill spindles $A_1$ and $D_1$ are supported by the cross slides 18 and 19, respectively. In FIG. 3, numbers 27 28, 27', 28', denote the fixing clamps of the cross slides 18 and 19. Numbers 29, 30, 29', 30' denote the fixing clamps of the large sliding blocks 16 and 17.

This example has the constitution as described above and as summarized as follows: the distance between the first drill spindles $B_1$ and $C_1$, as denoted as $M_1$ can be adjusted by turning handle 3, the distance between the second tool spindles $A_1$ and $D_1$ as denoted as $M_2$ can be adjusted by turning handle 26, and the perpendicular distance between the two pairs of spindles $B_1$-$C_1$ and $A_1$-$D_1$, denoted as N, can be adjusted by turning handle 10; and thus the four spindles, $A_1$, $B_1$, $C_1$, and $D_1$ can be arranged always in the pattern described in the principle. After each tool spindle is located in its position, the clamps 8, 9, 27 – 30, 27' – 30' fix the sliding blocks.

Figure 1C:
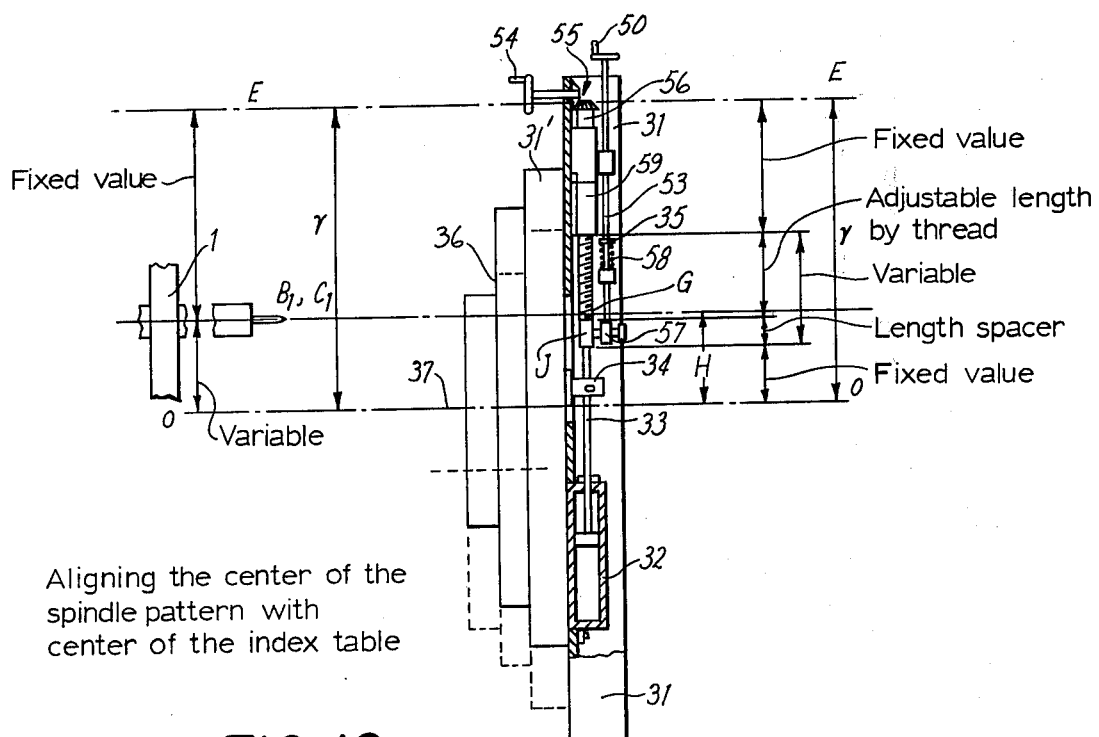

Next, an example of a second feature of the invention. Refer now to FIG. 1C which is a conceptional drawing of this invention. Sliding frame 31' is installed on the machine base 31 just below the cluster plate 1 and can be moved in a direction along the center line F — F which is assumed on the cluster plate. A hydraulic power cylinder 32 is equipped in the machine base 31. The piston rod 33 of that cylinder is fixed with its top end to the bracket 34 which is at the bottom of the sliding frame 31'.

A stopper 35 is installed on the threaded shaft mating with the spindle 56. By turning the handle 54, the spindle 56 is revolved through the bevel gears 55. The stopper 35 can extend or retract on its axis by revolving spindle 56 in either direction. Spacer 57 can be inserted between the stopper and the top end of the piston rod 33. A dividing index table 36 which is adapted to have the workpiece mounted thereon, is rotatably supported on the sliding frame 31'. The table turns around on its supporting spindle 37, the axis of which intersects and is perpendicular to the center line F — F. The line connecting a pair of the first spindles $B_1$ and $C_1$ can be made consistent with the line connecting the locations of the holes B and C which are on the index table 36, by moving the table and its supporting frame 31'.

This second feature of the invention has the above-mentioned constitution, so assume the case that the holes a, b, c, and d of the pitch circle u on the disc P, shall have to be drilled after the hole A, B, C, and D on the pitch circle q were drilled. (The pitch distance between the holes is equal in each case). By turning handle 3, the first threaded spindle 2 which has threaded parts 2' and 2" moves the spindles $B_1$ and $C_1$ in symmetry to the center line F — F through a distance equal to $\delta \leq$ BS — bV. By revolution of handle 26, the second threaded spindle 25 with two threaded parts on its both ends moves the spindles $A_1$ and $D_1$ in symmetry to the center line F — F through a distance equal to $\beta$ = AT — aW. By turning handle 10, cross threaded spindles 22 and 23, move the pair of cross slides on which spindles $A_1$ and $D_1$ are supported relative to the first spindle line $B_1C_1$ through distance r in parallel. Dividing index table 36 and frame 31' are moved horizontally, by the driving hydraulic cylinder 32, along the center line F — F to the crossing point G (Normal Point) through distance U at which crossing point the center of the index table and the center of the adjusted spindle pattern are aligned. After turning handles 3, 26 and 10, and after driving hydraulic cylinder 32 in the above-mentioned way, then all moving parts shall be fixed. Next, by starting the machine, the holes a, b, c, and d can be drilled on the pitch circle u with the definite pitch distance. If the number of the holes is twelve, one stroke of the drill spindles make four holes, so 12 ÷ 4 = 3, so repeating three times the sequence of drilling and indexing completes the operation. Index table 36 rotates 120° in each turn. The sequence of operation is done automatically.

Figure 5:
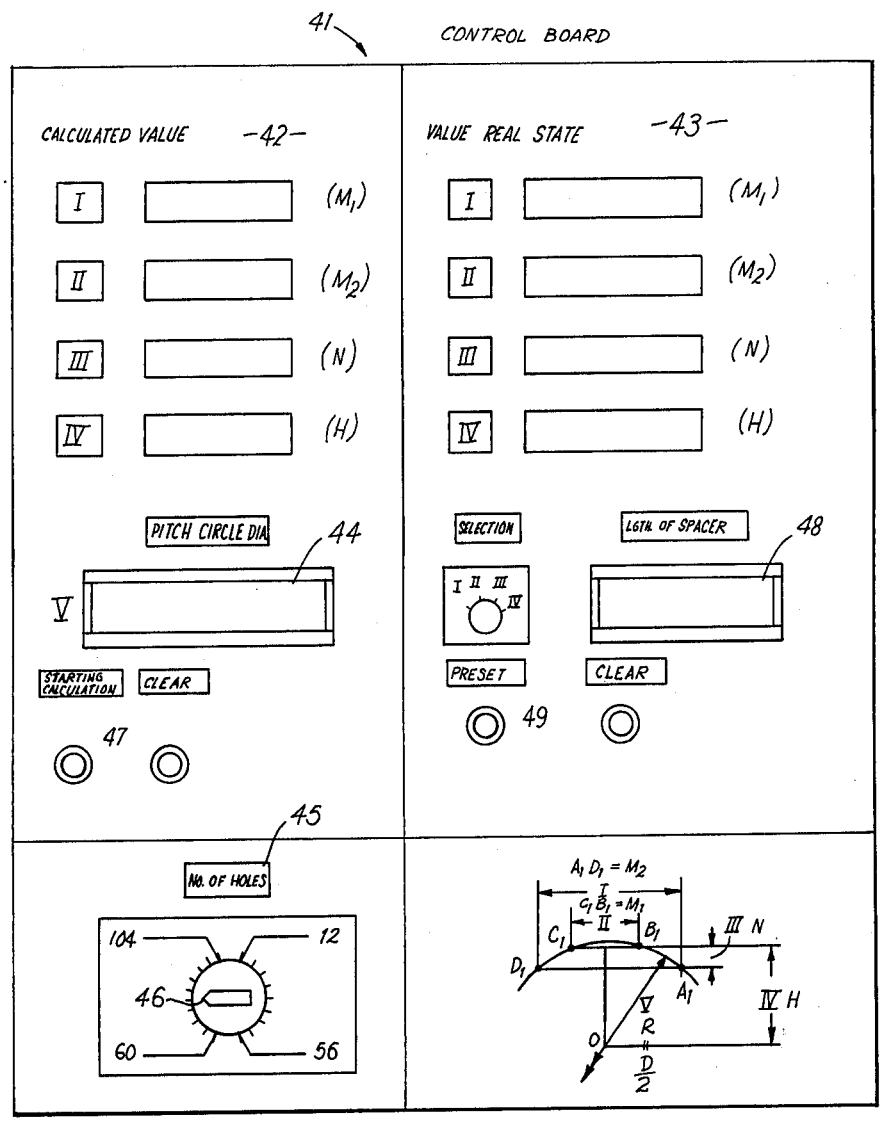
FIG. 5: A front view of the control panel.
Figure 6:
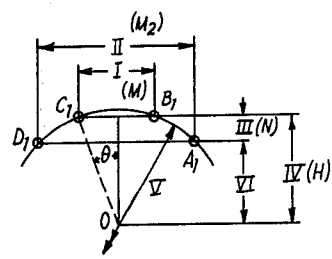
FIG. 6: An illustration to show the relation of the numbers denoted as I – IV to the pitch circle diameter and to the angle of the chord composed by center O and two locations of the holes.
Figure 7:
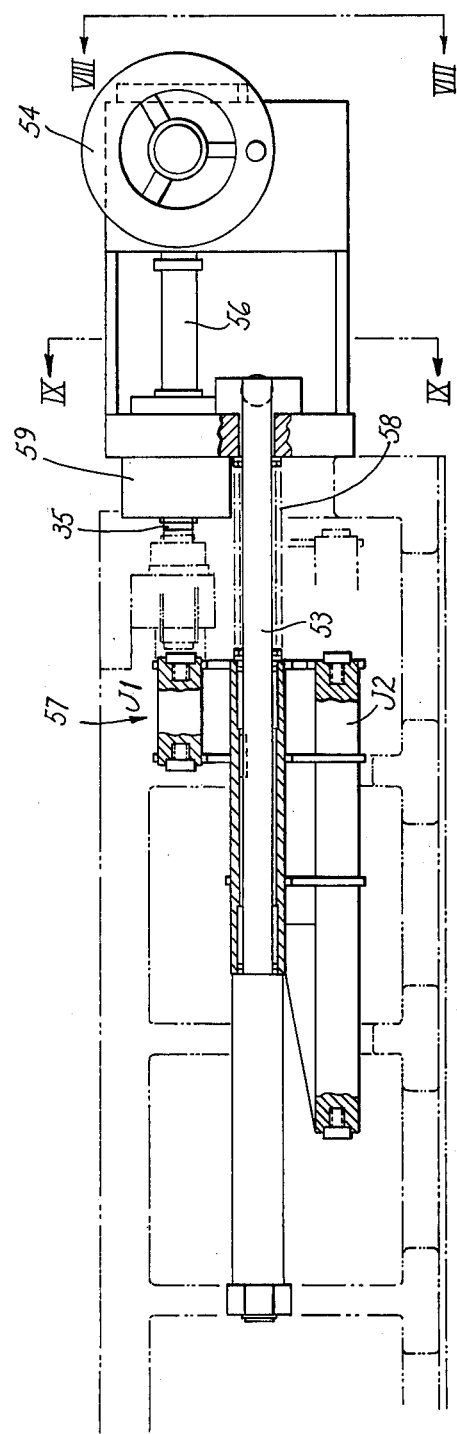
FIG. 7: A front view of the spacer part.
Figure 8:
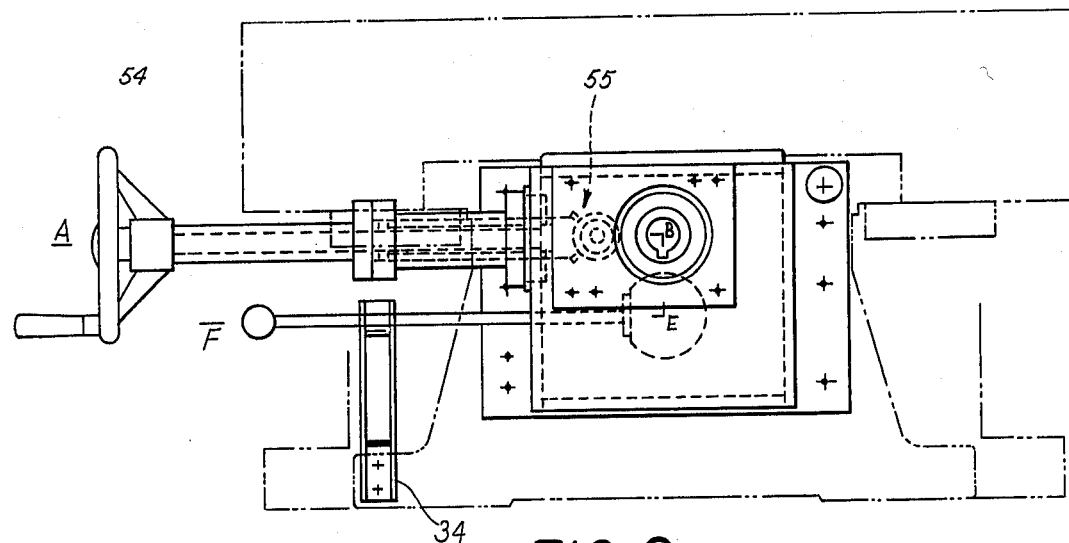
FIG. 8: A sectional view of FIG. 7 along line VIII — VIII.
Figure 9:
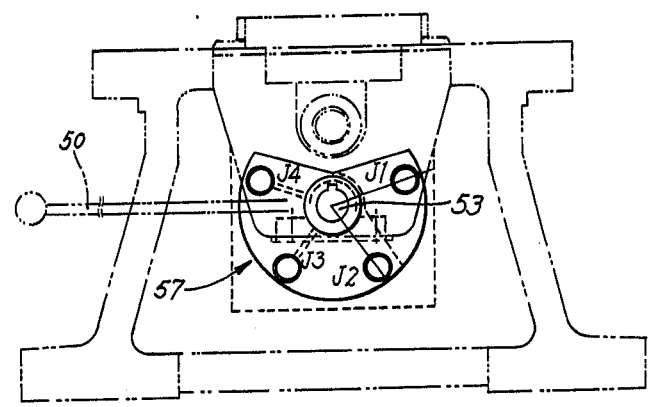
FIG. 9: A sectional view of FIG. 7 along line IX — IX.

A third feature of the invention shall now be explained. The first threaded spindle 2 (FIG. 3) driven by the handle 3 has pulse generator 38 at its end, the second threaded spindle 25 driven by the handle 26 has pulse generator 39 at its end, and the guide spindle 11 driven by the handle 10 has pulse generator 40 at its end respectively. The distance between the pair of second spindles $A_1$ and $D_1$ is denoted as I, the distance between the pair of first spindles $B_1$ and $C_1$ is denoted as II, the distance between lines $B_1C_1$ and $A_1D_1$ is denoted as III, and the distance between center point G (Normal Point) of line $B_1C_1$ and the center of the pitch circle of the holes to be drilled is denoted as distance IV, These four numbers I - IV are shown in the calculated value column of the control board 41 (FIG. 5). The digital numbers which are converted from pulses sent by generators 38, 39, 40 and 59 are shown on the "real state" column in contrast with the "calculated value". (The digital number relating to IV is made by addition of two numbers, one of which is converted from a pulse sent from pulse generator 59 of the shaft 56, and the number calculated mentally from the drawing.) The operator drives the four handles 3, 10, 26 and 54 so as to make the "real state" value consistent with the "calculated value". When the two numbers are consistent, then the spindles are arranged at the desired location.

The calculation column 42 indicates the number of the desired pitch circle V at the window 44. This is done by using a key board (not shown on the drawing). The number of the pitch circle is given on the drawing of the work piece.

The indicator 46 which is located at the lower part of the control board and is to indicate number of holes to be drilled, is turned to locate it on the mark denoting the number of the holes to be drilled, If the number of the holes to be drilled is 12, the indicator shall be turned to indicate itself on the mark 12. After that, the operator pushes the key board button 47 of the "Starting - Calculation", then the numbers I to IV appear on the corresponding panels in column 42. The computer used in the above calculations does not need to be complicated, but may possess simple circuits. The formula for the calculations are shown below:

I = $V\sin\theta$, II = $V\sin\theta 3$, IV = $V/2\cos\theta$,
VI = $V/2 \cos 3\theta$, III = IV - VI.
V = pitch circle diameter of the holes to be drilled
$2\theta$ = angle of the chord $B_1C_1$.

These numerical operations are easily done by modern computers and calculators of conventional construction, so the description thereof is excluded. As for the number indicated in window IV, the device and method works as described in the following manner.

Between the top of the piston rod 33 which makes one body with the sliding frame 31, and the stopper 35, the spacer 57 can be inserted. This spacer 57 is composed of several measuring rods and the spacer spindle 53. The measuring rods denoted as $J_1$, $J_2$, $J_3$, $J_4$, etc. are arranged in parallel to the spacer spindle and at the same radial distance from the spacer spindle by the supports. The spacer spindle can be turned by the handle 50. Spacer spindle 53 is always axially urged in the direction of the stopper 35 by the coil spring 58. The spacers each have the length of 100 mm, i.e. 100, 200, 300 and 400 mm. If the calculated number of the window IV indicates 123 mm, then first turn the handle 50 to insert spacer $J_1$ of 100 mm between the piston rod 33 and the stopper 35. Then, the length shorter than 100 mm i.e. in this case 23 mm, is provided by adjustment of the location of the stopper 35 which extends or retract by revolution of threaded spindle 56 by turning handle 54. The location where the end of the stopper 35 meets the center of the index table is marked as zero point. The handle 54 has divisions of 1 mm to 100 mm on itself. Also, spindle 56 has pulse generator 59 on its end.

The length of the 100 mm unit is already put in the window of the spacer column 48 by the manually-operated key board. Then, the operator turns handle 54 and moves stopper 35 through the length 23 mm (123 mm - 100 mm). Pulse generator counts 59 that length and number 23 is added to the length indicated in the window 48.

This example has the above-mentioned constitution, so that, if the 12 holes are to be drilled on a large pitch circle diameter, the number of the pitch circle diameter is put on the panel Pitch Circle Dia. in the window 44. (Its position is V in the lower part of the control board.) Dial indicator 46 is set to its division "12". Start the calculation by pushing the "Start Calculation" button 47. The numbers in panels I - IV is at once calculated and indicated. Turn the handles at the cluster plate, 3, 10, 26, and 54 at the base of the machine. Drive the hydraulic cylinder 32 of the dividing index table 36. The numbers which indicates the present location of the spindles and center of the index table appear in the windows of the column 43 showing the "real state" values.

The multi-spindle drilling machine which has distinguished features of (1) simple construction of the machine, (2) easy setting of the tool spindles, and (3) high efficiency of the machining rate, can be offered by embodying this invention.

The embodiment of the invention in which an exclusive property or privilege is claimed are defined as follows:

1. In a multi-spindle drilling machine, comprising:
   a frame;
   base slide means linearly slidably supported on said frame for movement in a selected horizontal direction;
   drive means connected to said base slide means for causing selective slidable displacement thereof in said horizontal direction;
   a rotatable index plate supported on said slide means for rotation about a vertical axis, said index plate having an upwardly facing support surface adapted to have a workpiece mounted thereon;
   head means spaced upwardly above said index plate and vertically slidably supported on said frame, said head means having support plate means defining a horizontal centerline which is parallel to said horizontal direction and intersects said vertical axis;
   a pair of first tool spindles rotatably supported on said plate means and projecting toward said index plate, said first spindles defining a first reference line which extends horizontally between and intersects the rotational axes of said first spindles, said first reference line being perpendicular to said horizontal centerline;
   first means movably supporting said first spindles on said plate means so that said first spindles are symmetrically supported on opposite sides of a vertical reference plane which passes through said horizontal centerline;
   first means for selectively adjusting said first supporting means for causing said first spindles to be simultaneously and synchronously moved in opposite directions along said first reference line selectively toward or away from said vertical reference plane;
   a pair of second tool spindles rotatably supported on said plate means and projecting toward said index plate, said second spindles defining a second reference line which extends horizontally between and intersects the rotational axes of said second spindles, said second reference line being parallel to and spaced from said first reference line;
   second means movably supporting said second spindles on said plate means so that said second spindles are symmetrically disposed on opposite sides of said vertical reference plane;
   second means for selectively adjusting said second supporting means for causing said second spindles to be simultaneously and synchronously moved on opposite sides of said vertical reference plane, said second adjusting means including (1) a first adjusting device for causing said second spindles to be simultaneously and synchronously moved in opposite directions along said second reference line selectively toward or away from said vertical reference plane and (2) a second adjusting device for causing both of said second spindles to be simultaneously and synchronously moved selectively toward or away from said first reference line, said first and second adjusting devices being independently controllable for selecting the desired movement and the resulting locations of said second spindles;
   whereby said first adjusting means and said first and second adjusting devices can be individually selectively adjusted so as to selectively position the four spindles at uniformly spaced intervals on a pitch circle of selected diameter, with said base slide means being selectively slidably displaced along said horizontal direction until the vertical axis of rotation of said index plate is vertically aligned with the center of said pitch circle, thereby permitting simultaneous drilling or tapping of at least four holes in a workpiece with said holes being uniformly spaced apart and located on the pitch circle of selected diameter.

2. A machine according to claim 1, including a control panel having means for digitally indicating the actual value of (1) the perpendicular distances between the pairs of first and second spindles as measured along the respective first and second reference lines, (2) the perpendicular distance between said first and second reference lines, and (3) the perpendicular distance between the first reference line and the center of the pitch circle defined by said pairs of first and second spindles;

and said control panel also having means for digitally indicating thereon the calculated value of the four distances mentioned above, said calculated value being mathematically determined based upon the selected diameter of the pitch circle and the number of holes to be drilled around said circle.

3. A machine according to claim 2, including pulse generator means assciated with the first and second supporting means for emitting pulses indicative of the position of the spindles, the pulses being transmitted to said control panel for visually indicating thereon a digital signal which indicates the actual values of the above-mentioned distances.

4. A machine according to claim 2, wherein said first supporting means comprises a pair of first slides which each have one of said first spindles rotatably mounted thereon and which are both linearly slidably movable parallel to said first reference line, said first adjusting means including a first mechanism drivingly connected to both of said first slides for causing simultaneous and synchronous movement thereof in opposite directions, said first mechanism comprising a rotatable spindle disposed in threaded engagement with both of said first slides;

said second supporting means comprising a pair of second slides which each have one of said second spindles supported thereon and which are both slidably movable parallel to said second reference line, said first adjusting means including a second mechanism drivingly connected to both of said second slides for causing simultaneous and synchronous movement thereof in opposite directions, said second mechanism including a rotatable spindle drivingly connected to each of said second slides;

said second supporting means also including a pair of third slides which are individually slidably supported on a respective one of said second slides for linear slidable movement along a horizontal line of movement which is perpendicular to said first and second reference lines, each of said third slides having one of said second spindles rotatably mounted thereon, and said second adjusting device including a third mechanism drivingly connected to both of said third slides for causing simultaneous and synchronous movement thereof in the same direction along said horizontal line of movement, said third mechanism including a rotatable spindle drivingly interconnected to each of said third slides.

5. A machine according to claim 4, including pulse generator means associated with each of the three-mentioned spindles for supplying to the control panel three digital signals which indicate the actual values of three of the above-mentioned distances.

6. A machine according to claim 5, including adjustable stop means coacting between said frame and said base slide means for limiting the movement of said base slide means so that when the latter is moved against said adjustable stop means, the vertical axis of the index plate is vertically aligned with the center of the pitch circle of the spindles, said adjustable stop means including a movable stopper connected to and moved by a rotatable screw-type spindle, and pulse generator means coating with the rotatable screw-type spindle for determining the location of the stop means and for transmitting a signal to the control panel which indicates thereon a digital value which is representative of the location of the vertical axis of the index table.

7. A machine according to claim 1, wherein said first supporting means comprises a pair of first slides which each have one of said first spindles rotatably mounted thereon and which are both linearly slidably movable parallel to said first reference line, said first adjusting means including a first mechanism drivingly connected to both of said first slides for causing simultaneous and synchronous movement thereof in opposite directions, said first mechanism comprising a rotatable spindle disposed in threaded engagement with both of said first slides;

said second supporting means comprising a pair of second slides which each have one of said second spindles supported thereon and which are both slidably movable parallel to said second reference line, said first adjusting means including a second mechanism drivingly connected to both of said second slides for causing simultaneous and synchronous movement thereof in opposite directions, said second mechanism including a rotatable spindle drivingly connected to each of said second slides;

said second supporting means also including a pair of third slides which are individually slidably supported on a respective one of said second slides for linear slidable movement along a horizontal line of movement which is perpendicular to said first and second reference lines, each of said third slides having one of said second spindles rotatably mounted thereon, and said second adjusting device including a third mechanism drivingly connected to both of said third slides for causing simultaneous and synchronous movement thereof in the same direction along said horizontal line of movement, said third mechanism including a rotatable spindle drivingly interconnected to each of said third slides.

8. A machine according to claim 1, including adjustable stop means coacting between said frame and said base slide means for limiting the movement of said base slide means so than when the latter is moved against said adjustable stop means, the vertical axis of the index plate is vertically aligned with the center of the pitch circle of the spindles .

9. A machine according to claim 8, wherein said adjustable stop means includes a movable stopper connected to and moved by a rotatable screw-type spindle.

* * * * *

UNITED STATES PATENT OFFICE
CERTIFICATE OF CORRECTION

Patent No. 4,066,378                    Dated January 3, 1978

Inventor(s) Toshio Saito et al.

It is certified that error appears in the above-identified patent and that said Letters Patent are hereby corrected as shown below:

Col. 7, line 17; before "spindles" insert ---tool---.

Col. 7, line 23; before "spindles" insert ---tool---.

Col. 7, line 34; before "spindles" insert ---tool---.

Col. 7, line 36; change "means" to ---device---.

Col. 7, line 49; before "spindles" insert ---tool---.

Col. 7, line 60; before "spindles" insert ---rotatable---.

Col. 8, line 7; before "spindles" insert ---tool---.

Col. 8, line 17; before "spindles" insert ---tool---.

Col. 8, line 28; before "spindles" insert ---tool---.

Col. 8, line 30; change "means" to ---device---.

Col. 8, line 43; before "spindles" insert ---tool---.

Col. 8, line 58; before "spindles" insert ---tool---.

Signed and Sealed this

Eleventh Day of April 1978

[SEAL]

Attest:

RUTH C. MASON
Attesting Officer

LUTRELLE F. PARKER
Acting Commissioner of Patents and Trademarks